US006199435B1

(12) United States Patent
Wilmer et al.

(10) Patent No.: US 6,199,435 B1
(45) Date of Patent: Mar. 13, 2001

(54) PIPETTING SYSTEM WITH A PIPETTING DEVICE AND AT LEAST ONE PIPETTE TIP RELEASABLY FASTENED THERETO

(75) Inventors: Jens Wilmer, Ahrensburg; Ernst Tennstedt, Hamburg, both of (DE)

(73) Assignee: Eppendorf-Netheler-Hinz GmbH, Hamburg (DE)

( * ) Notice: Subject to any disclaimer, the term of this patent is extended or adjusted under 35 U.S.C. 154(b) by 0 days.

(21) Appl. No.: 09/376,690

(22) Filed: Aug. 18, 1999

(30) Foreign Application Priority Data

Oct. 6, 1998 (DE) ........................................... 198 45 950

(51) Int. Cl.[7] ................................................ G01N 35/06

(52) U.S. Cl. ..................................................... 73/864.14

(58) Field of Search ........................... 73/863.32, 864.14, 73/864.17, 864.18

(56) References Cited

U.S. PATENT DOCUMENTS 4,187,724 * 2/1980 Citrin ................................ 73/864.14
4,478,094 * 10/1984 Salomaa et al. .................. 73/864.14
4,779,467 * 10/1988 Rainin et al. ..................... 73/864.14
5,057,281 10/1991 Torti et al. .
5,061,449 * 10/1991 Torti et al. ......................... 73/864.17
5,435,197 * 7/1995 Telimaa et al. .................... 73/864.14

FOREIGN PATENT DOCUMENTS 0265028 2/1987 (EP) .

* cited by examiner

*Primary Examiner*—Robert Raevis
(74) *Attorney, Agent, or Firm*—Brown & Wood, LLP

(57) ABSTRACT

A pipetting system with a pipetting device and at least one pipette tip releasably fastenable thereon, at least one fastening element on the pipetting device, on which the pipette tip is fastened, an ejection means on the pipetting device, which has an axially movable ejection element for releasing the pipette tip from the fastening element with an axial movement of the ejection element and a drive means for driving the axial movement of the ejection element, and a pull-means gear, push-means gear or linkage gear which transmits an essentially axial drive movement of the drive means into an axial movement of the ejection element and with which the ejection element at least on releasing the pipette tip from the fastening element is axially movable over a smaller distance than the essentially axial drive movement covers and an ejection force exceeding the force for the essentially axial drive movement can be exerted onto the pipette tip.

14 Claims, 8 Drawing Sheets

PIPETTING SYSTEM WITH A PIPETTING DEVICE AND AT LEAST ONE PIPETTE TIP RELEASABLY FASTENED THERETO

BACKGROUND OF THE INVENTION

The invention relates to a pipetting system with a pipetting device and at least one pipette tip releasably fastened thereto.

Such pipetting systems are above all used in the laboratory for metering fluid quantities. These fluids are suctioned into pipette tips and ejected therefrom. For this mostly pistons are displacably arranged in a cylinder. With air cushion systems the piston and cylinder are integrated into the pipetting device and communicate with the pipette tip so that the metering of the fluid is evaluated via an air cushion. With direct displacement systems the piston and the cylinder are integrated into the tip and act directly on the suctioned-in fluid. Such pipetting systems are also called syringes. Pistonless systems may in particular comprise a pipette tip with a balloon-like end section which expands for suctioning in fluid, and for expulsion is compressed.

The pipette tip is detachably connected to the pipetting device so that after usage it may be exchanged for a fresh pipette tip, by which means with subsequent meterings contaminations may be avoided. Pipette tips for one-off use are available inexpensively of plastic.

The pipetting devices have a fastening attachment for fastening pipette tips. Mostly this is a conical projection onto which is squeezed the pipette tip with a conical receiver. This may be effected without gripping the pipette tip by sticking the fastening attachment onto a pipette tip which is ready and waiting in a holder.

For avoiding contamination of the operating personnel it is furthermore desirable to release the pipette tip from the fastening attachment without grasping it. For this many pipetting devices are equipped with an ejection means which with an ejection sleeve is allocated to the upper edge region of the pipette tip and may be actuated on an ejection knob. With pipette tips which are stuck on particularly strongly or even “rammed on”, for the ejection of the tips however a high force effort is required which already with one-channel systems compromises the use or even makes it impossible. A particularly high force effort may result by way of the multiplied tip ejection forces with multi-channel pipetting systems which have several parallel pipette tips to be ejected.

From EP 0 566 039 B1 there is known a pipette with a tip remover which for simplifying the use by way of reduction of the ejection force comprises a lever mechanism. This lever mechanism projects laterally from a pipette housing and is to be pressed manually. It may have a toothed wheel which on an actuation arm for the pipette tip is rotatably coupled in a vertical plane. Further the inner flank of the toothed wheel meshes with a rack on the side of the elongate housing. On the outer side of the actuation arm on the side of the housing there is arranged a hollow push-rod which with a thread on its inner side meshes with the outer side of the gearwheel. If the push-rod is pressed down, the toothed wheel moves downwards and simultaneously takes with it the actuation arm and an ejection sleeve, by which means a pipette tip is pushed back from a fastening cone. With this the push-rod covers exactly double the distance as the actuation arm and the force exerted on the push-rod is half as large as the force used for pushing back the pipette tip. This system is expensive in its design and permits only a single transmission ratio of 1:2 so that it is limited in its usability.

BRIEF SUMMARY OF THE INVENTION

Proceeding from this it is the object of the invention to provide a pipetting system with an ejection means which apart from those mentioned previously also permits other transmission ratios and design simplifications.

This object is achieved by a pipetting system with the features of claim 1. Advantageous formations of the pipetting system are specified in the dependent claims.

The pipetting system according to the invention has

- a pipetting device and at least one pipette tip releasably fastenable thereon,
- at least one fastening element on the pipetting device, on which the pipette tip is fastened,
- an ejection means on the pipetting device, which has an axially movable ejection element for releasing the pipette tip from the fastening element with an axial movement of the ejection element and a drive means for driving the axial movement of the ejection element, and
- a pull-means gear, push-means gear or linkage gear which transmits an essentially axial drive movement of the drive means into an axial movement of the ejection element and with which the ejection element at least on releasing the pipette tip from the fastening element is axially movable over a smaller distance than the essentially axial drive movement covers and a force exceeding the force for the essentially axial drive movement can be exerted onto the pipette tip.

The pipetting system according to the invention is an alternative to the known pipette with tip remover, which on account of the pull-means gear, push-means gear or linkage gear permits the known transmission ratio as well as other transmission ratios and thus an increased freedom of design and expanded application possibilities. With a pipetting system according to the invention also transmission ratios are possible which vary during the tip ejection. Furthermore the pipetting system permits the possibility of constructional variations.

With a pull-means gear embodiment the drive means and the ejection element may have end sections which engage over one another and the gear may have a deflection roller rotatably mounted on the end section of the ejection element and a cable which at one end is fixed with respect to the fastening element and at the other end is fastened to the end section of the drive means. With this is it preferred that the drive rod and the ejection element are aligned parallel to one another. With the essentially axial drive movement over a certain distance the ejection element moves only over half this distance. At the same time however on the ejection element there is available a force for releasing the pipette tip, which is roughly double as large as the force exerted for the drive movement. Other transmission ratios may be achieved when several deflection rollers are mounted on the ejection element. This gear permits solutions which are particularly simple with respect to design.

With a push-means gear embodiment the gear has a first piston which is connected to the drive means and is displaceable in a first cylinder, and a second piston which is connected to the ejection element and is displaceable in a second cylinder, wherein the two cylinders communicate with one another, this communicating cylinder system is sealed to the surroundings and is filled with hydraulic fluid and the first piston has a smaller cross sectional surface than the second piston.

With these hydraulic transmission systems there is effected a displacement of the first piston over a certain distance, a displacement of the second piston over a smaller distance, wherein the ratio of the distances is inversely proportional to the ratio of the cross sectional surfaces of the two pistons. However the force exerted by the second piston on the ejection element and thus onto the pipette tip is larger that the force exerted by the drive rod onto the first piston, wherein the ratio of these forces is proportional to the ratio of the cross sectional surface of the two pistons.

With a further push-means gear embodiment the gear has a first bellows connected to the drive means and a second bellows connected to the ejection element, wherein the bellows are connected to one another in a communicating manner, this communicating bellows system being filled with hydraulic fluid and the smaller bellows having a smaller cross section than the second bellows.

With this system by way of the bellows of different diameters there is achieved a result corresponding to the pistons of different diameters. However here a sealing of the pistons or piston rods is done away with.

With both push-means gear designs there exists a large freedom in the selection of the transmission ratios. Also very simple design embodiments are possible.

With a linkage gear embodiment the gear comprises a first linkage rod which is linked to the drive means, and a second linkage rod which is linked to the ejection element, wherein the two linkage rods at the other end are linked to one another and in the linking region are guided along a guide which with respect to the fastening element is stationary in position and which comprises a first guide section whose distance to a common axis of the drive movement and of the ejection element increases in the direction of the drive means to the ejection element and is arranged such that the linking region, with the releasing of a pipette tip, is movable along this first guide section.

If the drive rod for the ejection of a pipette tip is moved axially the lining region of the two linkage rods gets into the region of the first guide section in that it diverts laterally from the common axis of the drive movement and of the ejection element. With this on the one hand the drive movement covers a larger distance than the ejection element and on the other hand on the ejection element there is made available a larger force than is exerted onto the drive rod. This embodiment likewise permits an extensive variability of the transmission ratio and even variable transmission ratios during an ejection procedure. Also here very simple design embodiments are possible.

With all embodiments the ejection element may be an ejection rod. This in turn may be connected to at least one further element of an ejection means. The fastening element may be a fastening attachment, a fastening receiver or likewise.

The invention may be applied with all types of pipetting systems, in particular with piston stroke and direct displacement systems with single stroke and dispenser systems, with hand and stationary systems, with manual and motorically driven systems and with one-hand and multi-channel systems.

Further details and advantages of the invention are evident from the subsequent description of four embodiment examples.

BRIEF DESCRIPTION OF THE DRAWINGS

The invention is hereinafter described in more detail by way of the accompanying drawings of five embodiment examples. In the drawings there are shown.

DETAILED DESCRIPTION OF THE INVENTION

Figure 1:
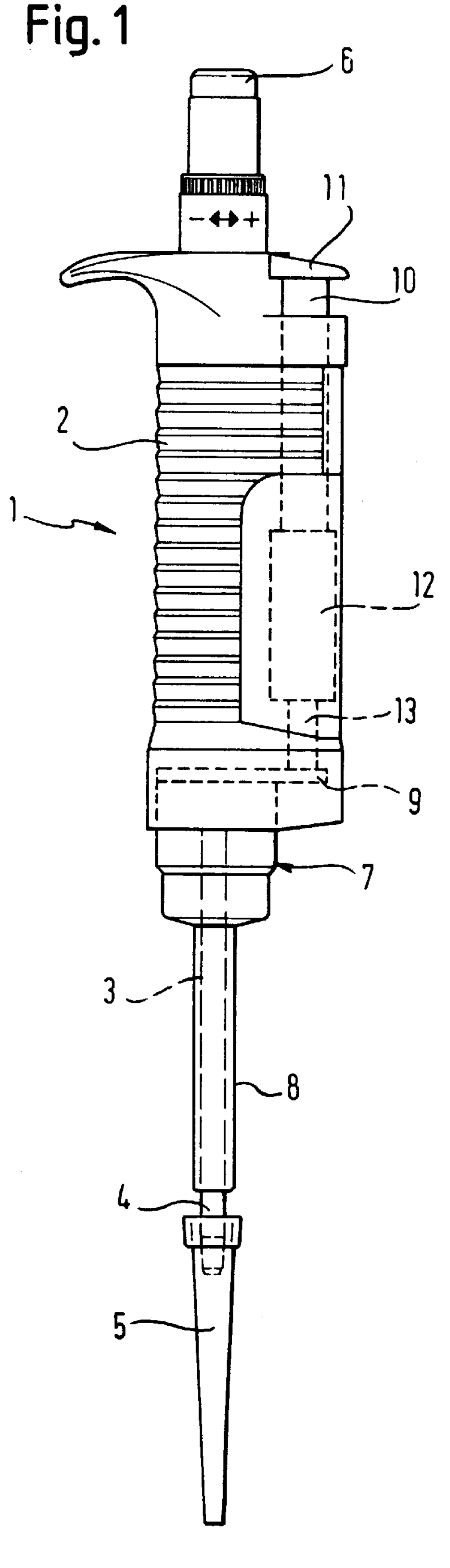
FIG. 1 a hand pipetting system in a course schematic view.

With the subsequent description of various embodiment examples for corresponding constructional elements the same reference numerals are used. The associated description has validity for all embodiment examples which have these reference numerals.

According to FIG. 1 a hand pipetting system according to the invention has a hand pipetting device 1 with a housing 2 and with a housing shank 3 which at the lower end comprises a fastening attachment in the form of an stick-on cone 4.

Onto the stick-on cone 4 there is stuck a pipette tip 5 so that it sticks on, but however may be pushed off the stick-on cone 4.

Above an actuation knob 6 protrodes from the housing 2. By way of axial pressing-in of the actuation button 6 in the housing 2 between two abutments a piston may be displaced in a cylinder. The cylinder is connected via a channel to an opening at the lower end of the stick-on cone 4. By way of displacement of the piston in the channel a column of air is moved. After pressing-in the piston 6 this may traverse back to its initial position supported by a spring, wherein the air column may aspirate fluid into the pipette tip 5. Renewed pressing-in of the actuation knob 6 effects an expulsion of fluid from the pipette tip 5.

For a subsequent releasing of the pipette tip 5 from the stick-on cone 4 the pipetting device comprises an ejection means 7. This has an ejection sleeve 8 displaceably arranged on the housing shank 3, with a lateral projection 9 on the upper edge within the housing 2. For actuating the ejection sleeve 8, on one longitudinal side in the housing 2 there is located a drive rod 10 which is parallel to the housing shank 3 and which is actuatable by way of an ejection knob 11 which above projects beyond the housing 2. The lower end of the drive rod 10 via a gear 12 is connected to the upper end of an ejection rod 13 which likewise is parallel to the housing shank 3. The lower end of the ejection rod 13 is in turn allocated to the lateral projection 9 of the ejection sleeve 8.

The gear 12 is a pull-means, push-means or linkage gear. It has a gear reduction. As a result of this on actuation of the ejection device 7 the displacement distance of the ejection head 11 is larger than the displacement distance of the ejection sleeve 8, however the force exerted by the ejection sleeve 8 onto the upper edge of the pipette tip 5 exceeds the force exerted on the ejection knob 11. Thus pipette tips 5 which are stuck may be released more easily from the pipetting device 1.

Figure 2:
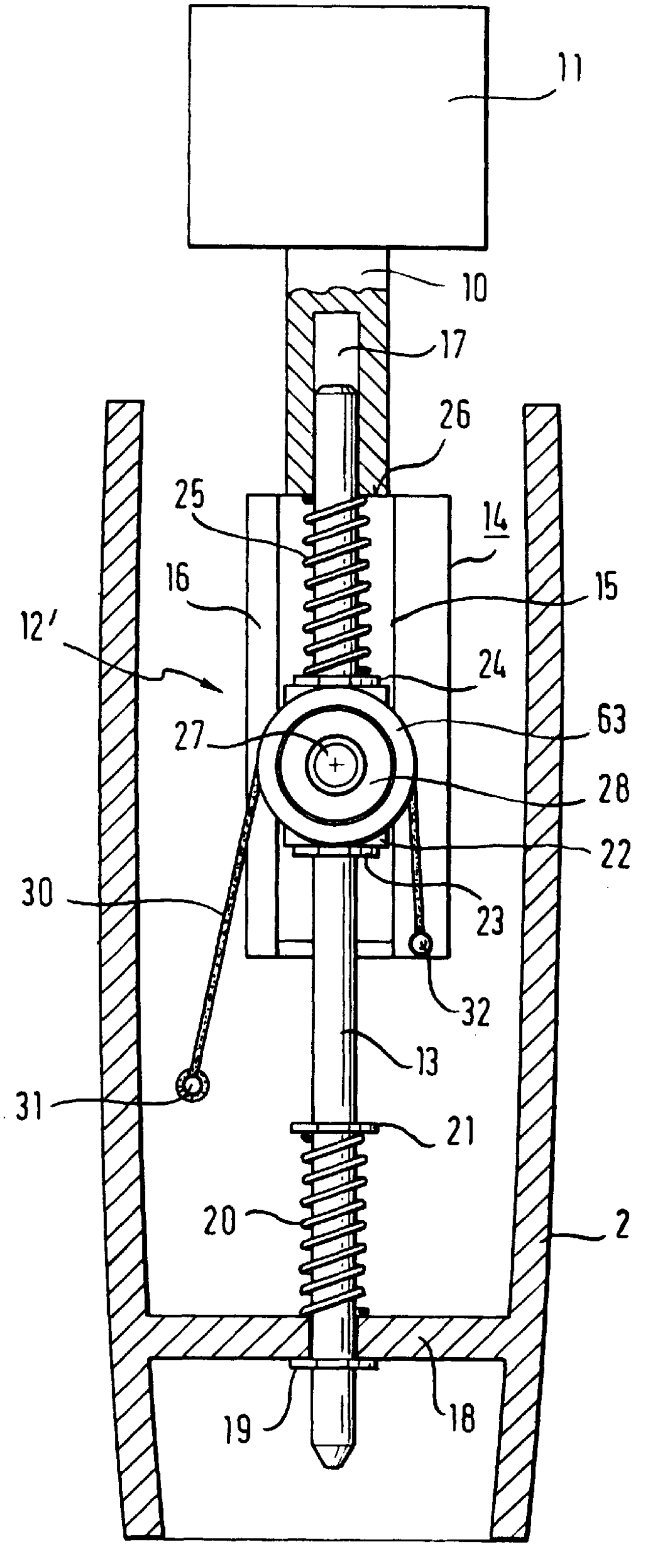
FIG. 2 an ejection means with pull-means gear in a longitudinal section through a pipetting device.
Figure 3:
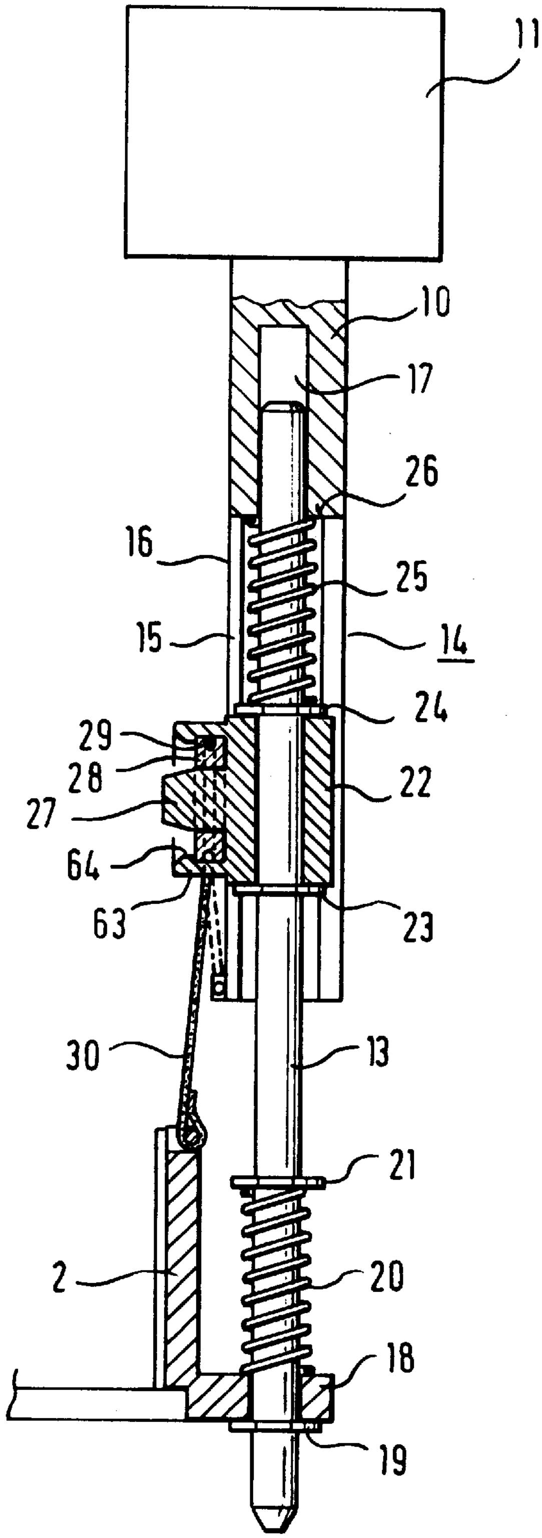
FIG. 3 the same ejection means in a longitudinal section through the pipetting device rotated about 90°.
Figure 3A:
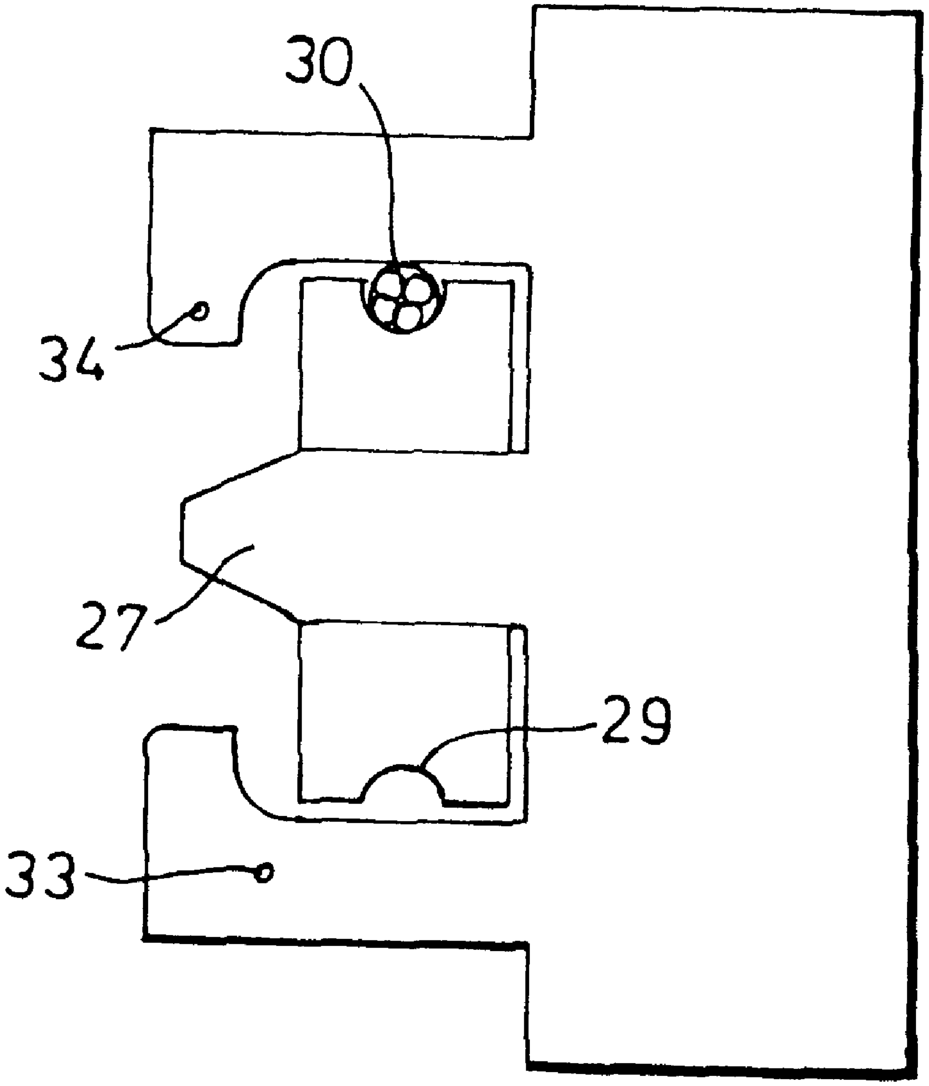

FIGS. 2 and 3 show an embodiment of the gear as a pull-means gear 12'. With this at the lower end section of the drive rod 10 there is present a guide block 14 in which there is formed an axially aligned guide groove 15 which has a lateral opening 16. Bordering on the guide block 14 the drive rod 10 comprises an axial guide bore 17.

The ejection rod 13 is guided through a transversely aligned housing wall 18. The ejection rod 13 below the housing wall 18 carries a ring which secures it against being upwardly pulled out. Above the housing wall 18 a compression spring 20 is guided on the ejection rod 13 which at one end is supported on the housing wall 18 and at the other end on a further ring 21 on which the ejection rod 13 sits.

On an upper end section the ejection rod 13 carries a bearing block 22. This is pushed onto the ejection rod 13 and by way of rings 23, 24 is secured on the ejection rod 13. The ejection rod 13 with its upper end projects into the guide bore 17 and the bearing block 12 is guided in the guide groove 15 of the guide block 14. Above the bearing block 22 on the ejection rod 13 there is guided a compression spring 25 which at one end is supported on the ring 24 and at the other end on a step 26 between the guide groove 15 and the guide bore 17.

On a bearing journal 27 of the bearing block 22, which protrudes from the opening 16, there is mounted a deflection roller 28. The deflection roller 28 on the circumference has a groove 29. Around the deflection roller 28 there is applied a cable 30 which is guided in the groove 29. The cable 30 may in particular be a steel or wire cable. It runs roughly over half the circumference of the deflection roller 28. One end of the cable 50 is fastened below the bearing block 22 onto the housing 2 and thus with respect to a stick-on cone 4 for a pipette tip 5. At the other end it is fastened below the deflection roller 28 on the guide block 14 at 32.

The fastening of the end 31 onto the housing 2 is effected for example by way of a loop which sits on a journal. The fastening on the guide block 14 is effected for example by way of a cable-resistant ball or other thickening which is pushed from the side into a receiver which comprises a passage for the cable 30.

The bearing block 22 comprises a ring 33 which is concentric to the bearing journal 27 and which secures the deflection roller 28 with a bulge 34 on the inner circumference and prevents the cable 30 from slipping out of the groove 29. The ring 33 however comprises passage bores through which the ends of the cable 30 are guided to the outside.

With an unactuated ejection knob 11 the gear 12' assumes the shown arrangement. If the ejection knob 11 is actuated then the drive rod 10 with the guide block 14 pulls the end of the cable 30 attached thereto downwards. At the same time the cable 30 is pulled downwards over the deflection roller 28 and simultaneously the deflection roller 28 and thus the bearing block 22 and the ejection rod 13 are pulled downwards. This pull-means gear 12' has the effect that with this the ejection rod 13 is moved through an ejection distance which is only half as large as the displacement distance of the drive rod 10. On the other hand the ejection force which can be exerted by the ejection rod 13 is double as large as the force bearing on the ejection knob 11. The lower end of the ejection rod 13 may thus directly or via an ejection sleeve 8 exert an increased force onto a pipette tip 5.

After unloading the ejection knob 11 the spring 20 presses the pull-means gear 12' back into the drawn initial position. The spring 25 pushes the drive rod 10 with respect to the ejection rod 13 back into the initial position and therefore compensates the differences of displacements of the drive rod 10 and ejection rod 13 so that the cable 30 is held under tension.

By way of the attachment of two deflection rollers on the ejection rod and on a deflection roller mounted fixed to the housing and by way of a cable guide from the drive rod via the first deflection roller of the ejection rod to the deflection roller fixed to the housing and from here to the second deflection roller of the ejection rod, even a quartering of the force effort may be achieved. Further variations are possible by way of roller arrangements and cable guides, as is known with block and tackles.

Figure 4:
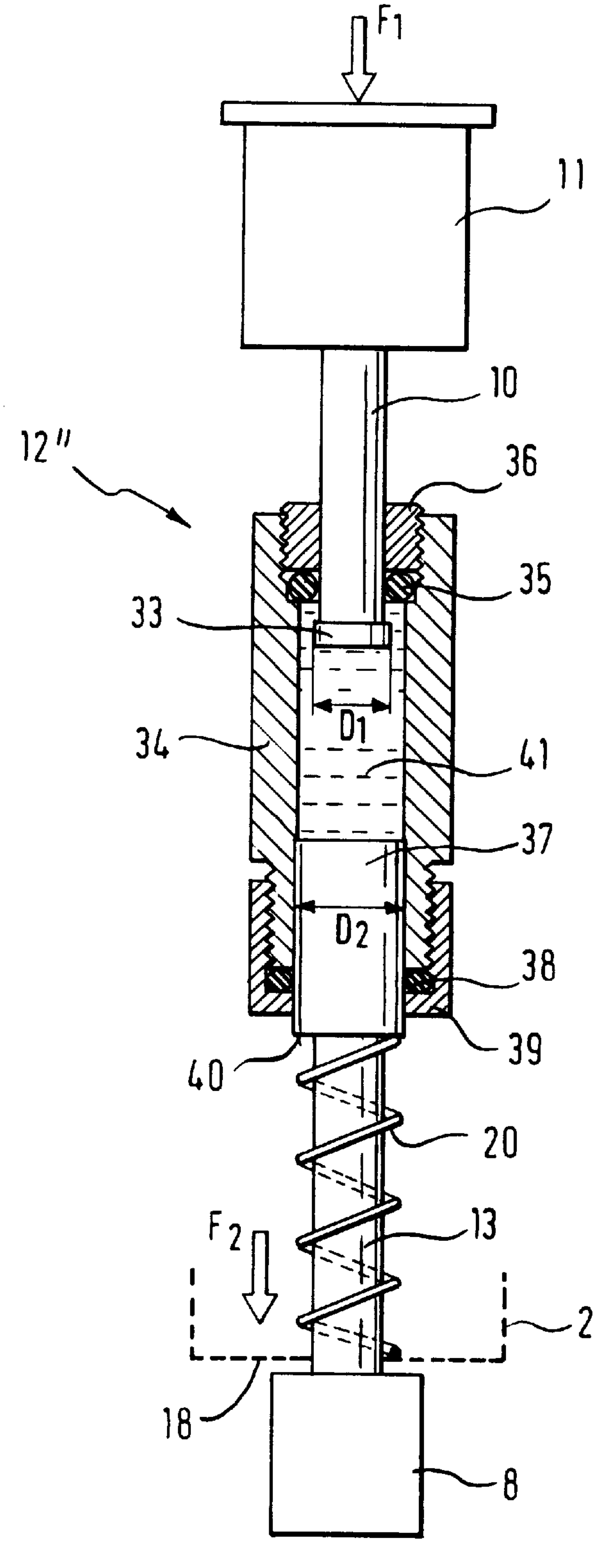
FIG. 4 an ejection means with push-means piston gear in a longitudinal section.

The push-means piston gear 12" shown in FIG. 4 may likewise be applied to a pipetting system according to FIG. 1. In this case the drive rod 10 is connected to a first piston 33. This is arranged axially displaceable in a cylinder 34. The drive rod 10 which at the same time is the drive rod of the piston 33, is sealingly guided through the upper opening of the cylinder 34. For this on an inner shoulder of the cylinder 34 there is supported an O-ring 35 which by way of a screw ring 36 is pressed between cylinder 34 and ejection rod 10, similar to a gland seal.

The maximum diameter $D_1$ of the piston 32 is clearly smaller than the inner diameter of the cylinder 34.

On the upper end of the ejection rod 13 there is seated a second piston 37 which is guided into the other end of the cylinder 34. At the end face of this end of the cylinder 34 there sits a further O-ring 38 which by way of a union nut 39 is sealingly pressed against the outer circumference of the piston 37. The outer diameter $D_2$ of the piston 37 corresponds roughly to the inner diameter of the section of the cylinder 34 in which it is displaceable.

The spring guided on the ejection rod is supported at one end on the transversely aligned housing wall 18 and at the other end on a shoulder 40 on the lower side of the piston 37.

The inner space of the cylinder 34, which is limited by the piston 33, 37 is completely filled with hydraulic fluid 41.

The gear 12" is shown in an unactuated arrangement. For a tip ejection the ejection button 11 is pressed so that the piston 33 submerges deeper into the cylinder 34. By way of this hydraulic fluid is displaced and the piston 37 is moved downwards against the action of the spring 20 so that the ejection rod 13 takes with it the ejection sleeve 8 and finally presses the pipette tip 5 from the stick-on cone 4. With this the distance covered by the drive rod 10 is greater than the distance covered by the ejection rod 13 and the ejection force ($F_2$) exerted by the ejection rod 13 onto the ejection sleeve 8 is larger than the force ($F_1$) acting on the ejection knob 11, since the diameter $D_2$ of the piston 37 is smaller that the diameter $D_1$ of the piston 33. For the force transmission ratio r ($=F_2/F_1$) of this hydraulic transmission system the following applies:

$$r=D_2^2/D_1^2$$

With this gear embodiment with the choice of the transmission ratio r one is very free.

Figure 6:
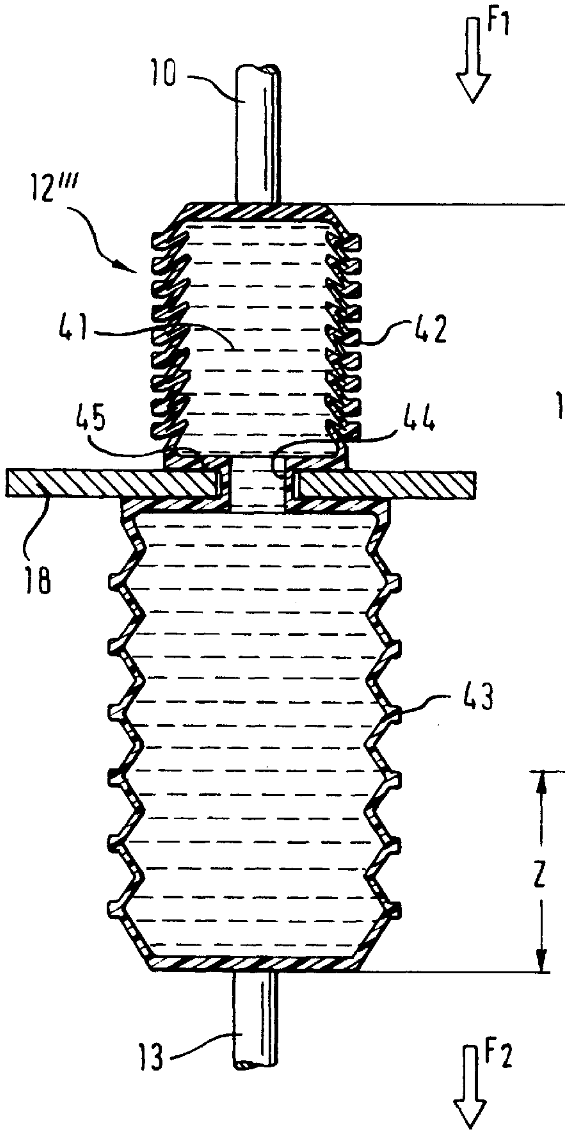
FIG. 6 the same ejection device in an actuated condition in a longitudinal section.
Figure 5:
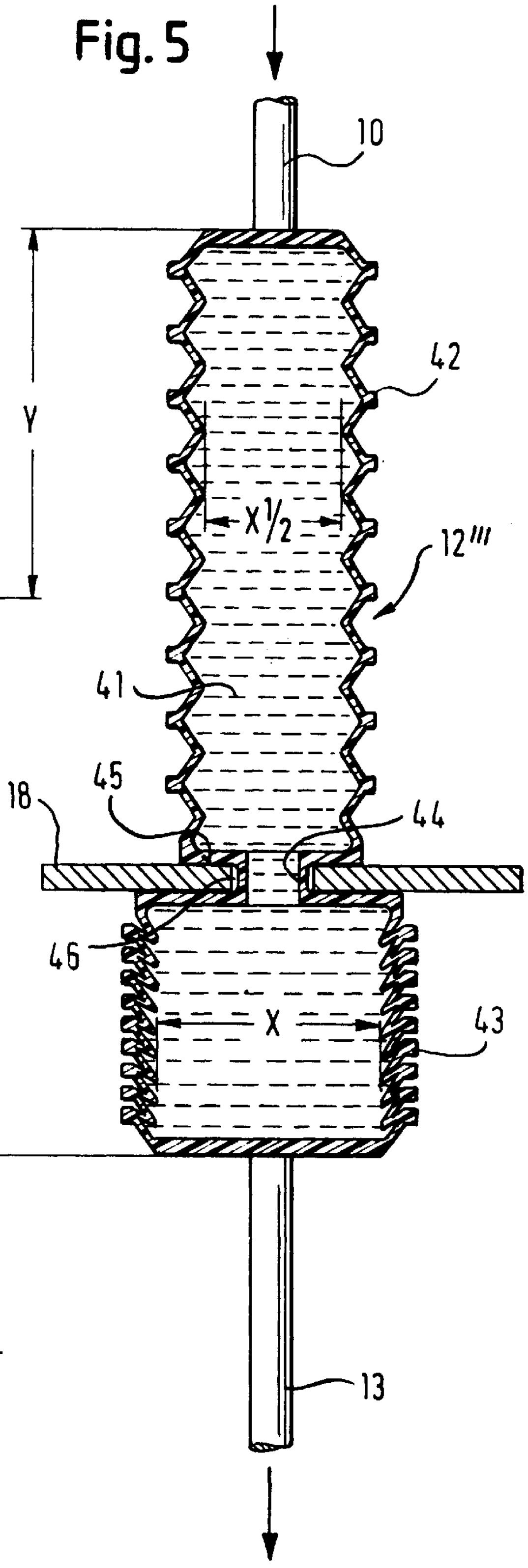
FIG. 5 an ejection means with push-means bellows gear in an unactuated condition in a longitudinal section.

Instead of this a pipette system according to FIG. 1 may also be equipped with the pushmeans bellows gear 12'" according to FIG. 5 and 6. This has a first bellows 42 which at the end face side is connected to the drive rod 10 so that it may be pressed together by this. Furthermore it has a second bellows 43 which on the end face side is connected to the ejection rod 13 so that on unfolding it axially displaces this. On end face sides which face one another the two bellows 42, 43 are connected to one another via a short tubing section 44 so that their inner spaces communicate with one another. In this region between the bellows 42, 43 there circulates a radially aligned groove 45 into which engages a transversely aligned housing wall 18. This wall has a laterally open slot 46 for inserting the tubing section 44.

The bellows 42, 43 and the tubing section 44 are filled with hydraulic fluid 41 or with another suitable fluid. They have a circular cross section, wherein the bellows 42 may have a roughly half as large diameter ($D_1$) as the bellows 43 ($D_2$).

The bellows 42, 43 may be manufactured of an elastic material such that unimpinged they have the desire to assume the initial shape shown in FIG. 5. It is however also possible to achieve this initial shape by way of an additional spring means.

Assuming this the bellows 42 by way of displacing the drive rod 10 may be pressed together in the direction of the arrow, wherein the hydraulic fluid 41 is displaced into the bellows 43 and expands this. Finally the arrangement according to FIG. 6 is reached in which the bellows is maximally pressed together and the bellows 43 is maximally expanded. With this the compression path Y of the bellows 42 is considerably larger than the expansion path Z of the bellows 43. However the bellows 43 presses on the ejection rod 13 with a considerably higher ejection force ($F_2$) than ($F_1$) introduced into the bellows 42 via the drive rod 10. Also with this hydraulic transmission system the transmission ratio $r(=F_2/F_1)$ is given by:

$$r=D_2^2/D_1^2$$

Figure 7:
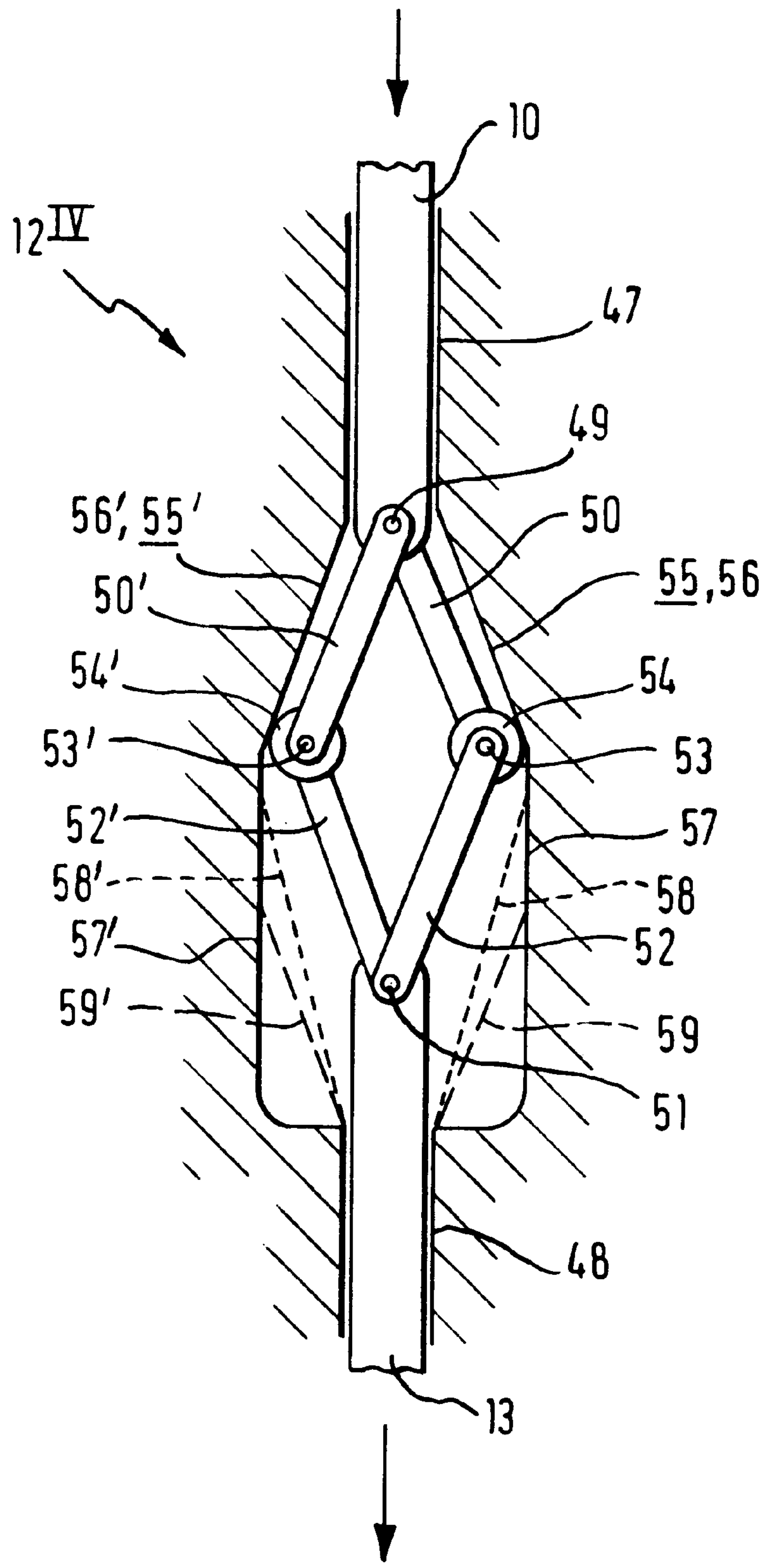
FIG. 7 an ejection means with a linkage gear with two linkage chains in a longitudinal section.

The pipetting system according to FIG. 1 may advantageously also be equipped with a linkage gear $\mathbf{12}^{IV}$ according to FIG. 7. The drive rod 10 and the ejection rod 13 are coaxially guided in axial guides 47, 48 of the housing. Onto the lower end of the drive rod 10 at 49 there are linked two first linkage rods 50, 50'. To the upper end of the ejection rod 13 at 51 there are linked two second linkage rods 52, 52'. In each case a first linkage rod 50, 50' and a second linkage rod 52, 52' are linked to one another at the other end at 53, 53'. Here in each case a roller 54, 54' is rotatably mounted.

Between the axial guides 47, 48 there is formed in the movement region of the rollers 54, 54' on both sides of the axis of the drive rod 10 and of the ejection rod 13 a guide 55, 55' with a certain contour. This disappears in a first guide section 56, 56' from the previously mentioned axis and in a second guide section 57, 57' is parallel to this axis.

On actuation of the ejection means $\mathbf{12}^{IV}$ by displacement of the drive rod 10 in the direction of the arrow firstly the rollers 54, 54' may be located within the guide 47. As soon as the rollers 54, 54' get into the region of the guide 55, 55' they follow the contour of the first guide section 56, 56' and distance themselves from one another. This situation is shown in FIG. 7. During the movement of the rollers 54, 54' over the first guide section 56, 56' as a result of this the ejection rod 13 is displaced over a shorter distance than the drive rod 10. On the other hand the ejection rod 13 may exert a larger force onto an ejection sleeve 8 than is exerted onto the drive rod 10. Thus advantageously the pipette tip 5 is pressed off the stick-on cone 4 whilst the rollers 54, 54' are moved along the guide section 56, 56'. In the subsequent second guide section 57, 57' the movement of the ejection rod 13 in turn corresponds to the movement of the drive rod 10, by which means a pipette tip 5 may already be pressed off in an accelerated manner.

By way of the first guide section 56, 56' a force amplifying transmission of e.g. 3.5:1 may be achieved. In the subsequent second guide section 57, 57' the transmission ratio is 1:1.

Subsequent to the first guide section 56, 56 in which the pipette tip is released, or instead of this for "the last push" one may go over to a "path-amplifying" transmission (e.g. 1:2 or the like). Examples for such further guide sections 58, 58' and 59, 59' are drawn in dashed.

Of course also other contours in the region of the guide 55, 55' are conceivable.

It is also interesting that in spite of force amplification on ejection of the pipette tip no total stroke shortening need occur, since the reduced stroke of the ejection rod 13 on ejection may be made up for at the end of the ejection procedure.

Figure 8:
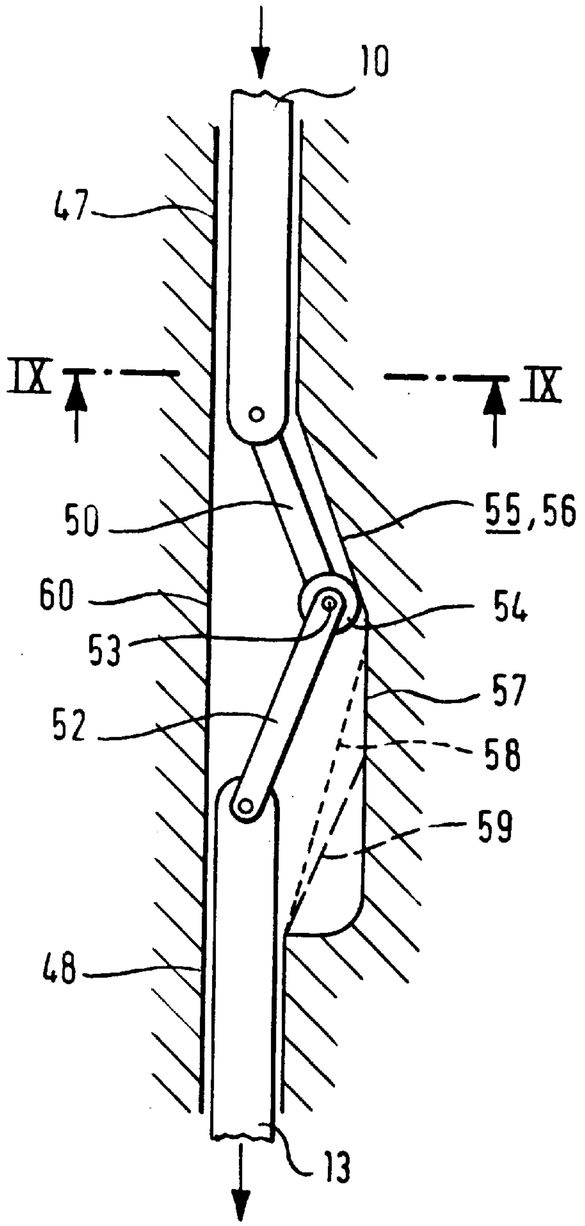
FIG. 8 an ejection means with a linkage gear with only one linkage chain in longitudinal section.
Figure 9:
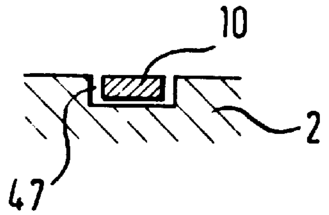
FIG. 9 the same ejection means in a section along the line IX—IX of FIG. 8.

According to FIG. 8 and 9 a linkage gear with a corresponding function may also be realized in that the drive rod 10 and the ejection rod 13 are only connected to one another via two linkage rods 50, 52 and only on one side of the common movement axis of the drive rod 10 and of the ejection rod 13 is there formed a guide 55 with the various sections 56, 57 (or 58, 59). A wall 60 lying opposite the guide 55 may then be flush with the borders of the guides 47, 48. By way of this a space-saving constructional manner is possible.

It is to be understood that linkage gears according to FIGS. 7 to 9 may cooperate with a spring means which act on the ejection rod 13 opposite to the direction of actuation, in order to restore this back to the original position

What is claimed is:

1. A pipetting system, comprising:

a pipetting device;

at least one fastening element securable to the pipetting device;

a pipetting tip releasably fastenable on the fastening element;

an ejection means provided on the pipetting device and including an axially movable ejection element for releasing the pipette tip from the fastening element upon an axial movement of the ejection element, and drive means for axially displacing the ejection element, and a pull-means gear for transmitting an essentially axial drive movement of the drive means into an axial movement of the ejection element, with the ejection element at least on releasing the pipette tip from the fastening element, being axially movable over a smaller distance than a distance of the essentially axial movement of the drive means, and with ejection force acting on the pipette tip exceeding a force applied to the drive means for effecting the essential axial movement of the drive means, wherein the drive means and the ejection element have overlapping end sections, and wherein the pull-means gear includes a deflection roller rotatably mounted on the end section of the ejection element, and a cable which at one end is stationary with regard to the fastening element and at another end is fixed to the end section of the drive means.

2. A pipetting system according to claim 1, wherein the ejection element is impinged by a spring means acting opposite to the axial movement on releasing the pipette tip.

3. A pipetting system according to claim 2, wherein the spring means is a compression spring effective between a counter bearing which is stationary with respect to the fastening element and a counter bearing of the ejection element.

4. A pipetting system according to claim 1, wherein the drive means comprises at least one of an axially moving drive rod and/or a manually actuatable ejection knob.

5. A pipetting system according to claim 1, in which the end sections of the drive means and of the ejection element are guided telescopically in one another.

6. A pipetting system according to claim 1, wherein on the end section of the ejection element there is fixed a bearing block on which the deflection roller is rotatably mounted, the end section of the drive means having a guide block with a guide groove accommodating the bearing block, with a lateral opening from which the deflection roller protrudes.

7. A pipetting system according to claim 6, wherein one end of the ejection element, which protrudes beyond the bearing block, is guided in a guide bore of the end section of the drive means, said guide bore bordering on the guide groove.

8. A pipetting system according to claim 6 wherein between the drive means and ejection element there is arranged spring means which counteracts the engaging over of the end sections.

9. A pipetting system according to claim 8, wherein the spring means is a compression spring arranged between the bearing block and a step between the guide groove and guide bore.

10. A pipetting system according to claim 1, comprising a hand pipetting device or a stationary pipetting device.

11. A pipetting system according to claim 1, wherein the system is a one-channel or a multi-channel system.

12. A pipetting system according to claim 1, comprising an ejection device driven manually or electrically.

13. A pipetting system according to claim 12, in which the drive means has a drive rod with a manually actuatable ejection knob or with a linear motoric drive.

14. A pipetting system according to claim 1, wherein the pipette tip on the fastening element is fasted with a clamping force of at least 0.5 N, preferably of 0.5 to 80 N, which can be overcome by the ejection means.

* * * * *